United States Patent
Yadav

(10) Patent No.: US 8,902,736 B2
(45) Date of Patent: Dec. 2, 2014

(54) SELECTING AN ALTERNATIVE PATH FOR AN INPUT/OUTPUT REQUEST

(75) Inventor: Praveen Kumar Yadav, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 673 days.

(21) Appl. No.: 13/082,280

(22) Filed: Apr. 7, 2011

(65) Prior Publication Data

US 2012/0260121 A1      Oct. 11, 2012

(51) Int. Cl.
 H04L 12/26    (2006.01)
 H04L 12/703   (2013.01)
 G06F 11/20    (2006.01)

(52) U.S. Cl.
 CPC ............ *G06F 11/2005* (2013.01); *H04L 45/28* (2013.01)
 USPC ............ 370/225; 370/217; 370/221; 370/248

(58) Field of Classification Search
 CPC .................................................. G06F 11/2005
 USPC ................ 370/217, 225, 227, 228, 221, 248; 709/224, 227; 710/316, 38; 714/6, 3
 See application file for complete search history.

(56) References Cited

U.S. PATENT DOCUMENTS

| | | | |
|---|---|---|---|
| 7,127,545 B1 * | 10/2006 | Nandi et al. ................. | 710/316 |
| 8,204,980 B1 * | 6/2012 | Sandstrom et al. .......... | 709/224 |
| 2007/0168705 A1 * | 7/2007 | Dohi ................................. | 714/6 |
| 2009/0031057 A1 * | 1/2009 | Ghosalkar et al. ............. | 710/38 |
| 2009/0216886 A1 * | 8/2009 | Zhu et al. ....................... | 709/227 |
| 2009/0235110 A1 * | 9/2009 | Kurokawa ........................ | 714/3 |

OTHER PUBLICATIONS

Vemuri et al.; Application as filed for: "System and Method for Domain Failure Analysis of a Storage Area Network"; U.S. Appl. No. 11/521,039, filed Sep. 14, 2006.

* cited by examiner

*Primary Examiner* — Brian D Nguyen
*Assistant Examiner* — Toan Nguyen
(74) *Attorney, Agent, or Firm* — Wilmer Cutler Pickering Hale and Dorr LLP

(57) ABSTRACT

A first path for forwarding an I/O request from a host device to a disk in a disk array is identified. The first path includes two endpoints (a first initiator endpoint on the host device and a first target endpoint on the disk array) separated by a storage area network. In response to an indication that the first path is non-functional, a second path to the disk for the I/O request is identified as an alternative to the first path. The second path includes a second initiator endpoint and a second target endpoint and is identified by selecting a path from among those paths that have at least one endpoint that is different from the two endpoints of the first path.

20 Claims, 9 Drawing Sheets

SELECTING AN ALTERNATIVE PATH FOR AN INPUT/OUTPUT REQUEST

RELATED U.S. APPLICATION

This application is related to U.S. patent application Ser. No. 11/521,039, filed Sep. 14, 2006, now U.S. Pat. No. 7,930,583, entitled "System and Method for Domain Failure Analysis of a Storage Area Network" by H. Vemuri et al., which is hereby incorporated by reference herein its entirety.

BACKGROUND

A data center or data storage system includes a host and a disk array that communicate via a storage area network (SAN)—the SAN is between the host and the disk array. The host may be a server on which applications including the storage management function are executed.

The majority of input/output (I/O) failures that are observed in a typical SAN are due to disruptions in the transport of information between the host and the disk array. These "transport failures" may occur at one or both of the Small Computer System Interface (SCSI) endpoints along each transport path, e.g., at the host bus adapter (HBA) on the host side and/or at the port/storage processor on the disk array side.

In the event of a transport failure, the multipathing solution (process) is expected to quickly failover the disrupted path to an available alternative path without any intervention at the upper layers of the SAN. At the time of failover, the multipathing solution should be able to choose, with a high probability of success, an alternative path to service an I/O request. As SAN environments become more and more complex, and I/O failover requirements become more stringent, it becomes more important for the multipathing solution to make quicker and more intelligent failover decisions.

However, conventional multipathing solutions randomly choose the alternative path and thus cannot assure that the new path will likely be successful. In other words, because the alternative path is randomly chosen, it is possible to choose as the alternative path a path that includes the disabled (nonfunctioning) endpoint. If the alternative path includes the disabled endpoint, then failover is delayed. If the delay is significant, the I/O request may time out before it is serviced. Thus, an I/O request that might have been otherwise serviced (if the failover had occurred quickly) instead times out, reducing the measured availability of the system.

SUMMARY

Embodiments according to the present disclosure pertain to a methodology for selecting a failover path in response to a transport failure between a host and a disk array.

According to an embodiment of the present disclosure, a first path for forwarding an I/O request from a host device to a disk in a disk array is identified. The first path includes two endpoints (a first initiator endpoint on the host device and a first target endpoint on the disk array) separated by a storage area network (SAN). An indication that the first path is suspect (e.g., non-functional) may be received. More specifically, the first path may be non-functional due to a transport failure—a failure of at least one of the two endpoints. That is, the transport failures of interest for purposes of this disclosure are at the endpoints and not within the SAN itself.

In response to an indication that the first path is suspect (e.g., non-functional or unavailable for an unknown reason), a second path to the disk for the I/O request is identified as an alternative to the first path. The second path includes a second initiator endpoint and a second target endpoint, and is identified by selecting a path from among the paths that have at least one endpoint that is different from the two endpoints of the first path. A load balancing policy can be applied in order to select the second path from among the eligible paths.

In the second path, the second initiator endpoint may be different from the first initiator endpoint, or the second target endpoint may be different from the first target endpoint, or both the second initiator endpoint may be different from the first initiator endpoint and the second target endpoint may be different from the first target endpoint.

In one embodiment, the paths are separated into subpath failover groups. In response to the indication that the first path is suspect, all paths in the first subpath failover group may be marked as suspect. In such an embodiment, the first path is in a first subpath failover group, and the second path is selected from a second subpath group that is different from the first subpath failover group. More specifically, in one embodiment, an attempt is made to identify a subpath failover group that includes paths to the disk that have both endpoints different from the two endpoints of the first path; that subpath failover group is selected as the second subpath failover group if the attempt is successful. If such a subpath failover group cannot be identified, then the second subpath failover group is selected from a subpath failover group that includes paths to the disk that have at least one endpoint that is different from the two endpoints of the first path.

Thus, according to embodiments of the present disclosure, a second (failover) path can be chosen that decreases, and even eliminates, the possibility that the failover path includes the suspect/non-functional endpoint. As noted above, the probability that the failover path will be successful is increased by choosing a path with two different endpoints than the first (suspect or non-functional) path if possible, or at least by choosing a path with one different endpoint than the first path. More specifically, SAN topology information can be used to choose the failover path and service the I/O request, by implementing a policy of choosing an alternative path having an endpoint or endpoints that do not overlap with the path that failed.

Significantly, it is not necessary to identify the endpoint that failed in order to select a failover path. Instead, a failover path can be selected, and mechanisms can be employed in the background to identify and service the disabled endpoint. Because the failover path is not randomly selected but instead is intelligently selected, performance is increased due to the increased likelihood that failover will be successful. Fewer timeouts will occur, and system availability is increased.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
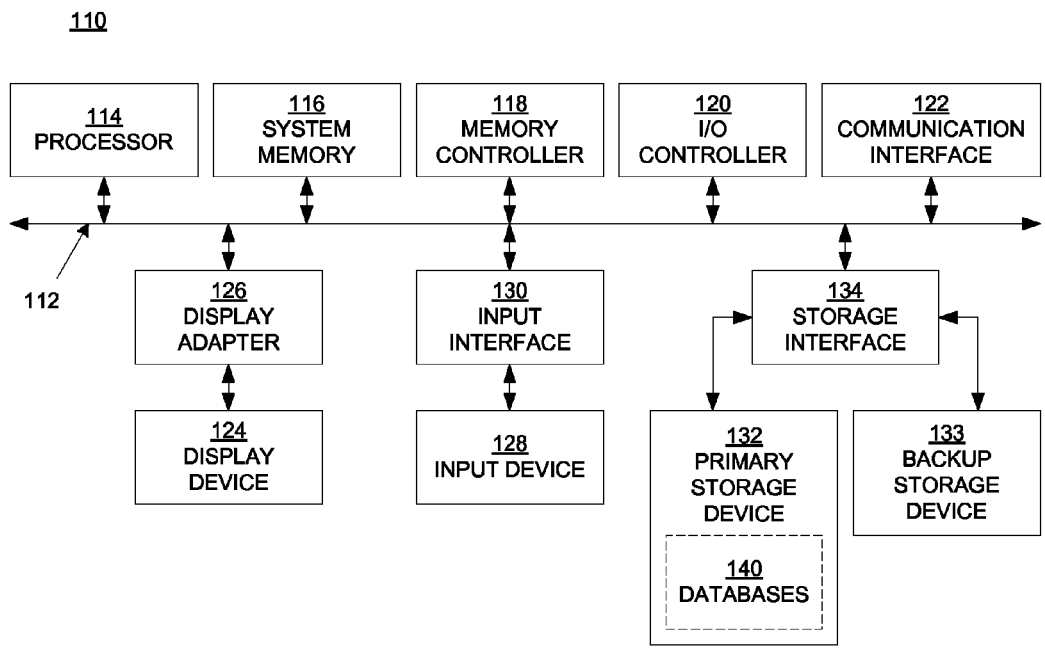
FIG. 1 is a block diagram of an example of a computing system capable of implementing embodiments according to the present disclosure.

Embodiments according to the present disclosure better choose a failover path that decreases, and even eliminates, the possibility that the failover path includes the disrupted endpoint. In one embodiment, this is accomplished by choosing a path with at least one different endpoint than the disrupted path. In another embodiment, this is accomplished by choosing a path with two different endpoints than the disrupted path.

More specifically, SAN topology information can be used to choose the failover path and service AN I/O request. As redundant paths generally have different endpoints and are not expected to fail at the same time, the proposed solution implements a policy of choosing an alternative path having endpoints that do not overlap with the path that failed.

Consider, for example, a system that includes four initiator endpoints C0, C1, C2, and C3 (C0-C3) and four target endpoints T0, T1, T2, and T3 (T0-T3). If an I/O request to a disk in the disk array along the path C0-T0 is disrupted, then a failover path can be selected from all paths that do not include the initiator endpoint C0, or a failover path can be selected from all paths that do not include the target endpoint T0. Alternatively, a failover path can be selected from all paths that do not include either initiator endpoint C0 or target endpoint T0.

One particular technique for implementing such a policy is to create groups of paths per subpath failover groups (SFGs). An SFG defines a group of paths between the host and the various disks in the disk array that utilize the same endpoints. For each disk in the disk array, one node (a "metanode") is mapped to the set of paths that are connected to the disk, and the appropriate multipathing policy for the disk array is associated with the metanode.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "identifying," "selecting," "indicating," "determining," "marking," "attempting," "making," or the like, refer to actions and processes (e.g., flowcharts 800 and 900 of FIGS. 8 and 9, respectively) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. For example, processor 114 may perform and/or be a means for performing, either alone or in combination with other elements, one or more of the identifying, determining, using, implementing, translating, tracking, receiving, moving, and providing described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112. Memory controller may perform and/or be a means for performing, either alone or in combination with other elements, one or more of the operations or features described herein.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the operations described herein. I/O controller 120 may also be used to perform and/or be a means for performing other operations and features set forth in the instant disclosure.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution. Communication interface 122 may perform and/or be a means for performing, either alone or in combination with other elements, one or more of the operations disclosed herein. Communication interface 122 may also be used to perform and/or be a means for performing other operations and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device. In one embodiment, input device 128 may perform and/or be a means for performing, either alone or in combination with other elements, one or more of the operations disclosed herein. Input device 128 may also be used to perform and/or be a means for performing other operations and features set forth in the instant disclosure.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or a plurality of databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Storage devices 132 and 133 may be used to perform, and/or be a means for performing, either alone or in combination with other elements, one or more of the operations disclosed herein. Storage devices 132 and 133 may also be used to perform, and/or be a means for performing, other operations and features set forth in the instant disclosure.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware. For example, computing system 110 may be configured as an application specific integrated circuit (ASIC) adapted to implement one or more of the embodiments disclosed herein.

Figure 2:
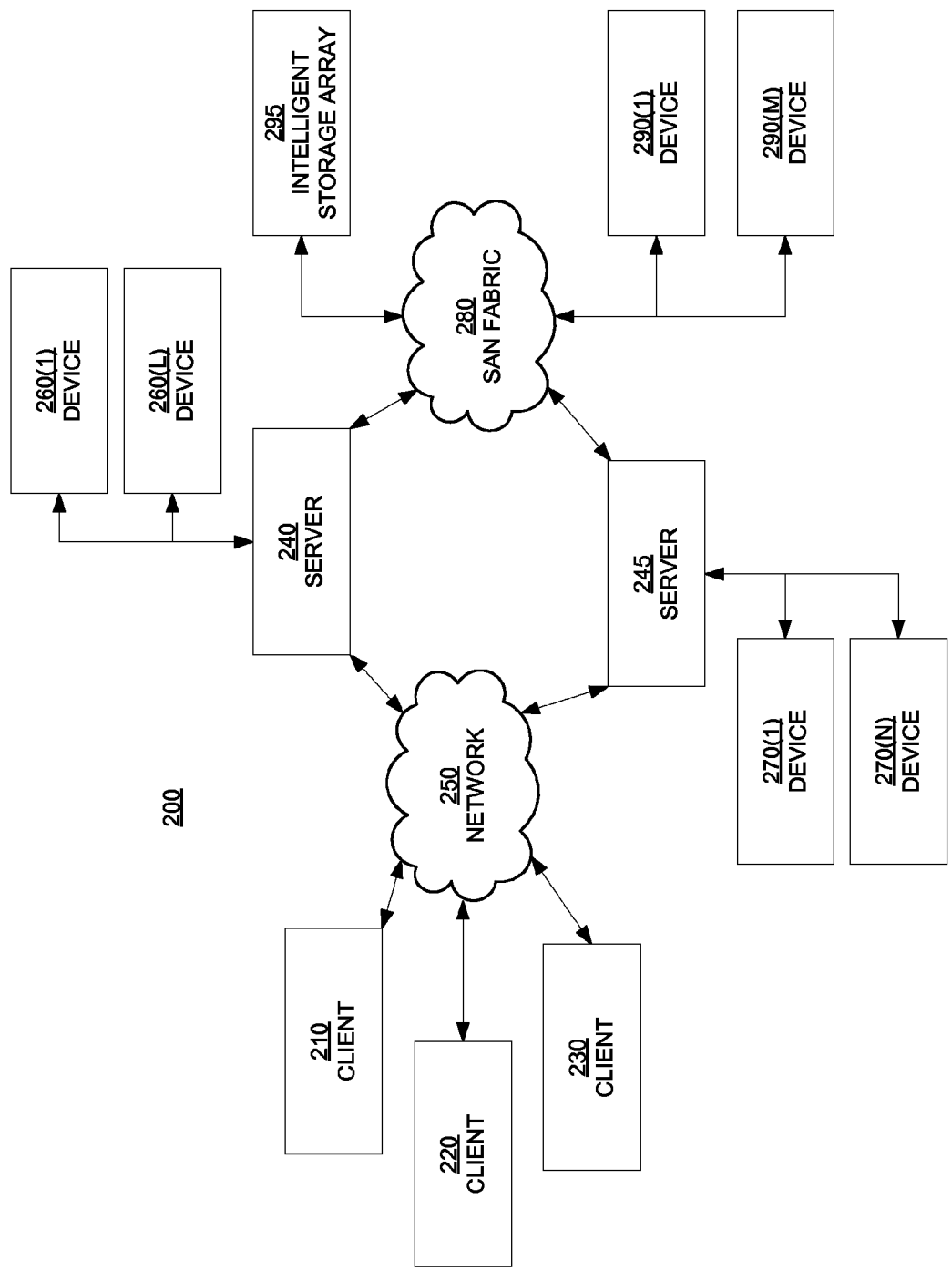
FIG. 2 is a block diagram of an example of a network architecture capable of implementing embodiments according to the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250. Accordingly, network architecture 200 may perform and/or be a means for performing, either alone or in combination with other elements, one or more of the operations disclosed herein. Network architecture 200 may also be used to perform and/or be a means for performing other operations and features set forth in the instant disclosure.

Figure 3:
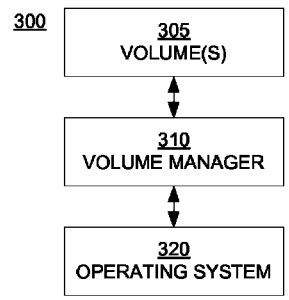
FIG. 3 is a block diagram depicting a volume management system according in an embodiment according to the present disclosure.

With reference to FIG. 3, a volume manager 310 operates as a subsystem between an operating system 320 and one or more volumes 305 of data (blocks of data) that are stored in a data storage system (see FIG. 2 for examples). The data storage system may include physical storage devices such as an array of physical disks, LUNs (SCSI logical units), or other types of hardware that are used to store data. The volume manager 310 overcomes restrictions associated with the physical storage devices by providing a logical volume management layer that allows data to be spread across multiple physical disks within a disk array (not shown) in a manner that is transparent to the operating system 320, in order to distribute and/or balance input/output (I/O) operations across the physical disks. Each of the volumes 305 can retrieve data from one or more of the physical storage devices, and the volumes 305 are accessed by file systems, databases, and other applications in the same way that physical storage devices are accessed. The operation of the volume manager 310 in the manner just described is well known.

Figure 4:
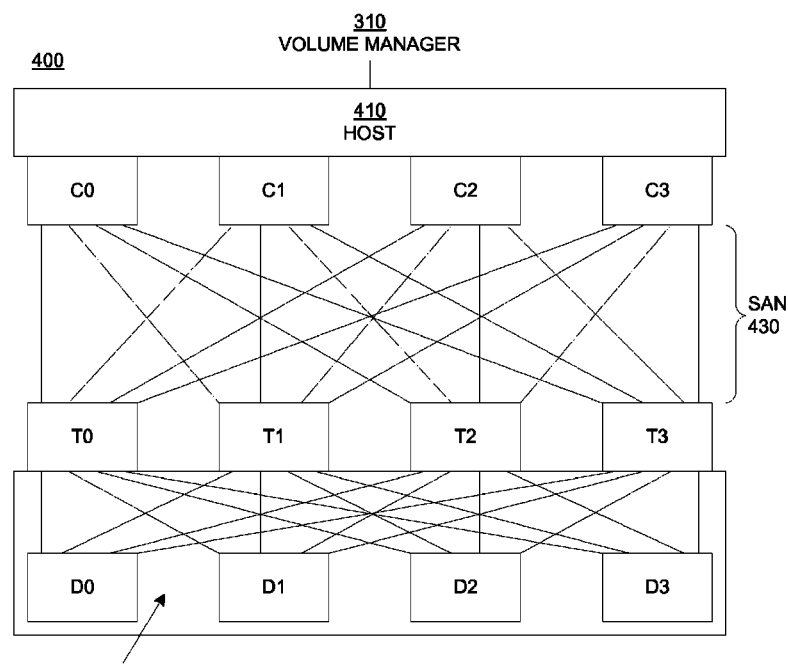
FIG. 4 illustrates an example of a storage system in an embodiment according to the present disclosure.

In the example of FIG. 4, a data center or data storage system 400 includes a host 410 and a disk array 420 that communicate via a storage area network (SAN) 430—the SAN is between the host and the disk array. The host may be a server on which applications including the storage management function are executed.

A number of ports or endpoints C0, C1, C2, and C3 (C0-C3) are on the host side of the system 400, and a number of ports or endpoints T0, T1, T2, and T3 (T0-T3) are on the disk array side of the system. There may be any number of such endpoints, and the number of host-side endpoints can be different from the number of disk array-side endpoints. In one embodiment, the endpoints C0-C3 are HBA ports. In a SCSI environment, the endpoints C0-C3 are referred to as SCSI initiators, and the endpoints T0-T3 are referred to as SCSI targets. A SCSI initiator initiates a SCSI session; a SCSI target does not initiate sessions but instead waits for an I/O request from a SCSI initiator. Embodiments described herein are not limited to a SCSI environment, and so the endpoints C0-C3 may be generally referred to as initiator endpoints and the endpoints T0-T3 as target endpoints. The initiator endpoints and the target endpoints communicate over the SAN 430 using a protocol such as, but not limited to, the Fibre Channel protocol.

The disk array includes a number of disks D0, D1, D2, and D3; there may be any number of such disks. Each disk is in communication with each of the endpoints T0-T3, which in turn are in communication with each of the endpoints C0-C3. Thus, as shown in FIG. 4, an I/O request through any initiator endpoint can pass through any target endpoint to any disk in the disk array, depending on the path and destination that are selected. Possible paths include all combinations of C0-C3 and T0-T3; in the example of FIG. 4, there are 16 possible paths between the endpoints. A load balancing policy may be implemented in order to select a path and/or destination for an I/O request.

Figure 5:
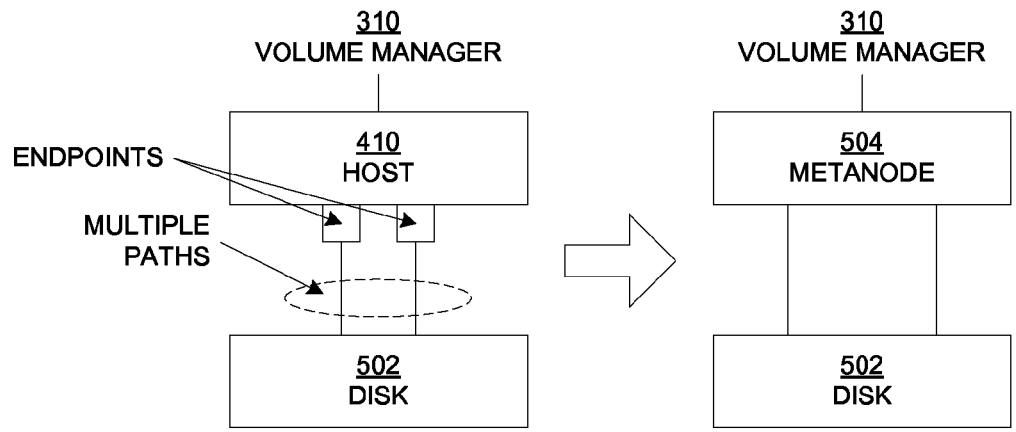
FIG. 5 illustrates an example of a metanode for a disk in an embodiment according to the present disclosure.

With reference to FIG. 5, in one embodiment, the volume manager 310 uses "metanodes" to access disks in the system 400. For each disk (e.g., disk 502), a metanode (e.g., metanode 504) is mapped to the set of paths that are connected to the disk. Thus, multiple physical paths can be represented as a single node. In the example of FIG. 5, there are two paths to the disk 502, through two different endpoints or nodes on the host 410. However, the volume manager 310 uses the single metanode 504 to represent the two paths to that disk.

As mentioned previously herein, the majority of I/O failures that are observed in a typical storage system 400 are due to disruptions in the transport of information between the host 410 and the disk array 420. These "transport failures" may occur at one or both of the endpoints along each transport path. That is, the transport failures of interest for purposes of this disclosure are at the endpoints and not within the SAN 430 itself.

A transport failure can be indicated and detected in a variety of ways. For example, an I/O request sent from the host 410 may return as having failed due to a timeout or some other type of error. If a component like a switch fails in the SAN 430, an event notice can be generated. The host 410 can register so that it is notified of such events and update its topology information accordingly.

As the redundant paths under a metanode generally have different endpoints and are not expected to fail together, a failover policy according to embodiments of the present disclosure choose an alternative (failover) path having endpoints that do not overlap, at least partially and perhaps totally, with the endpoints on the path that is suspected of having failed.

Figure 6A:
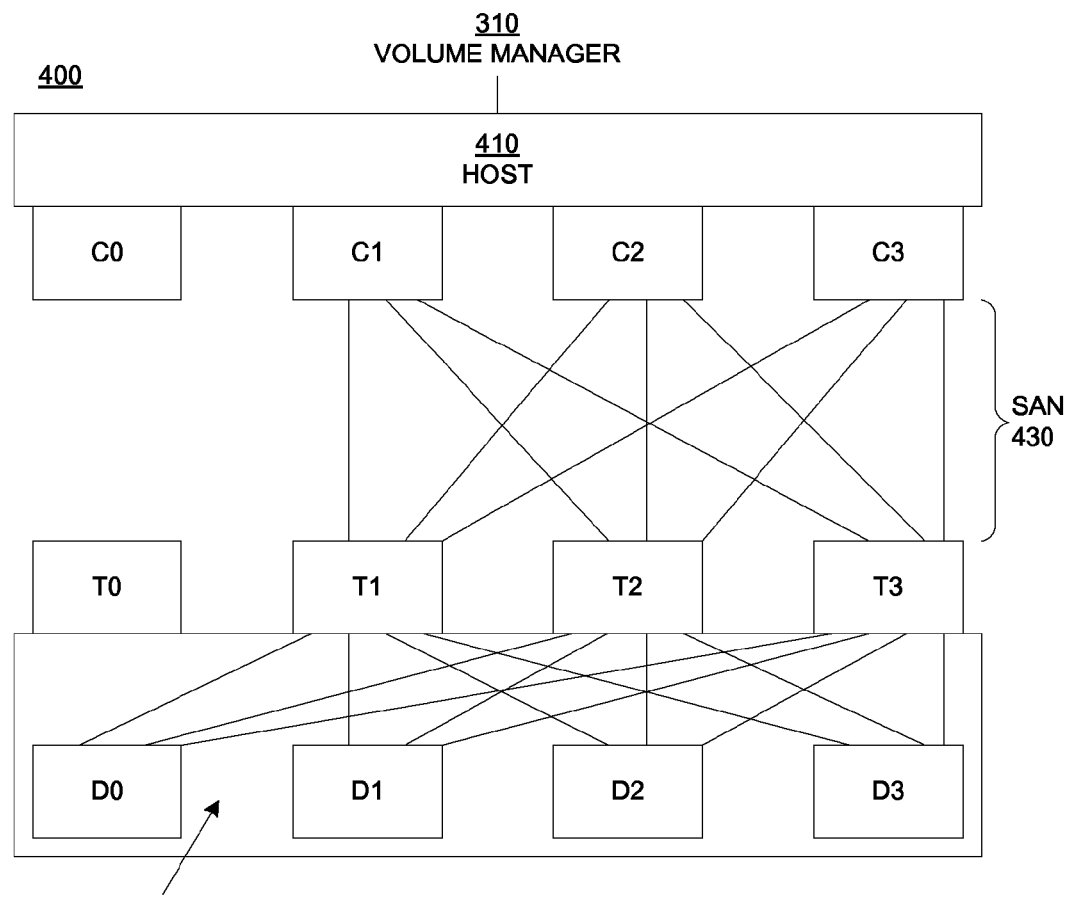
FIGS. 6A, 6B, and 6C illustrate examples of potential failover paths in embodiments according to the present disclosure.

More specifically, if an I/O request to a disk in the disk array along the path C0-T0 is disrupted, for example, then a failover path can be selected from all paths that do not include either initiator endpoint C0 or target endpoint T0. As shown in the example of FIG. 6A, there are nine possible paths between endpoints that do not include either the initiator endpoint C0 or the target endpoint T0. A different path within the SAN 430 (FIG. 4) is not being selected; instead, different endpoints for a path are being selected.

Figure 6B:
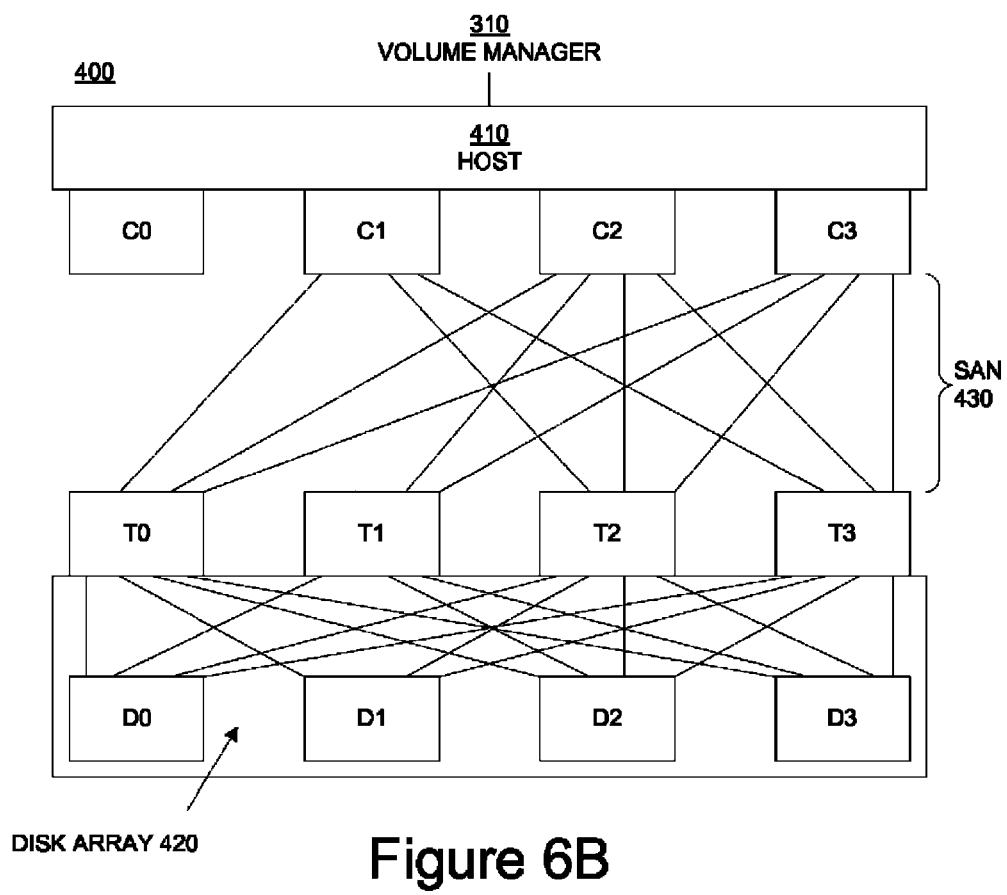

Alternatively, if an I/O request to a disk in the disk array along the path C0-T0 is disrupted, then a failover path can be selected from all paths that do not include the initiator endpoint C0. As shown in the example of FIG. 6B, there are 12 possible paths between endpoints that do not include the initiator endpoint C0.

Figure 6C:
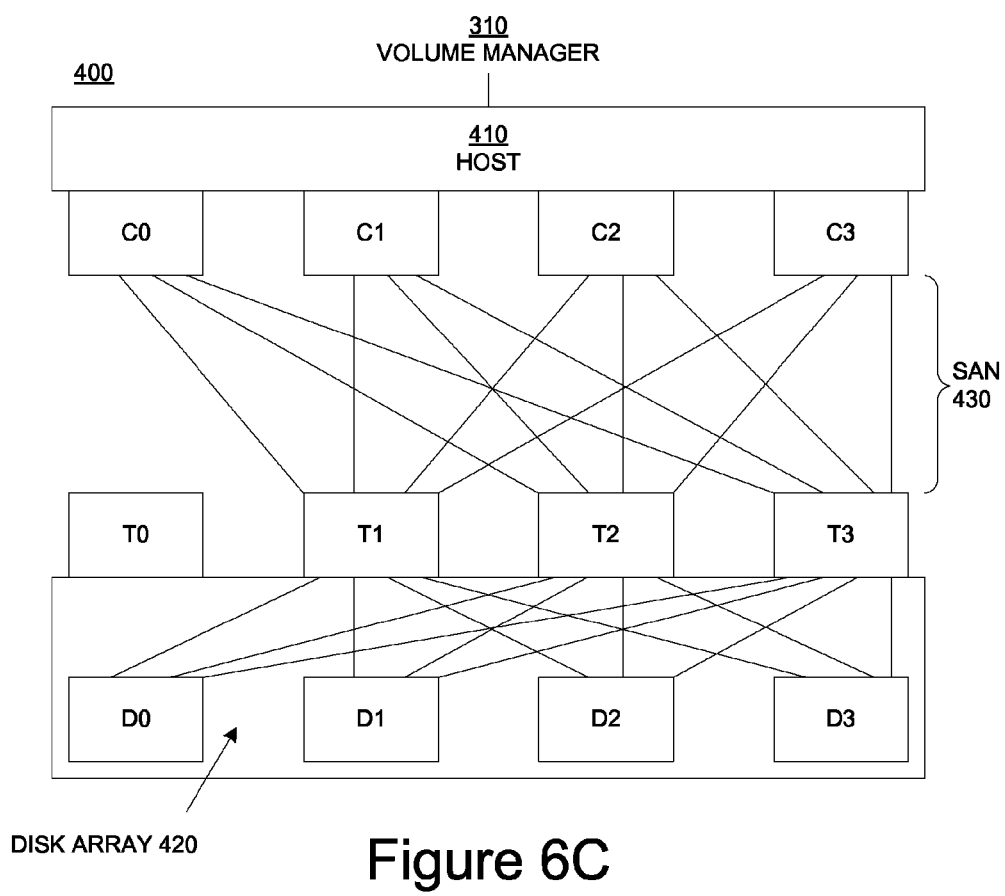

As another alternative, if an I/O request to a disk in the disk array along the path C0-T0 is disrupted, then a failover path can be selected from all paths that do not include the target endpoint T0. As shown in the example of FIG. 6C, there are 12 possible paths between endpoints that do not include the target endpoint T0.

The course of action just described can be implemented in hierarchical fashion. That is, if a path cannot be found in which both endpoints are different from the suspect path (as in the example of FIG. 6A), then a path that does not include just one endpoint (e.g., does not include the initiator endpoint C0) can be selected as the failover path. If the path that includes a different initiator endpoint does not work, then a path can be selected that does not include the other endpoint (e.g., the target endpoint T0).

Accordingly, an attempt need not be made to identify which of the endpoints on the non-functional path is the source of the problem. Consequently, failover can be accomplished more quickly relative to the conventional approach. Furthermore, relative to the conventional approach, the policies just described increase the probability that the failover path will be successful. In the example of FIG. 6A, by removing all potentially suspect paths from the pool of paths that are candidates for the failover path, the probability that the failover path will be successful is greatly increased. In the examples of FIGS. 6B and 6C, the probability is less relative to the example of FIG. 6A; however, the overall probability of success is greater relative to the conventional approach.

Because, according to embodiments of the present disclosure, the failover path is not randomly selected but instead is intelligently selected, system performance is improved due to the increased likelihood that failover will be successful. Fewer time outs will occur, and system availability is increased.

One particular technique for implementing such a policy is to create logical groups of paths under a metanode, referred to as subpath failover groups (SFGs). An SFG, in general, represents a group of paths that could fail and restore together. More specifically, an SFG defines a group of paths between the host and the various disks in the disk array that utilize the same endpoints; paths with the same endpoints between the host 410 and the disk array 420 (FIG. 4) are bundled into one logical SFG. For each disk in the disk array, one node (a metanode) is mapped to the set of paths that are connected to the disk, and the appropriate multipathing policy for the disk array is associated with the metanode.

Figure 7B:
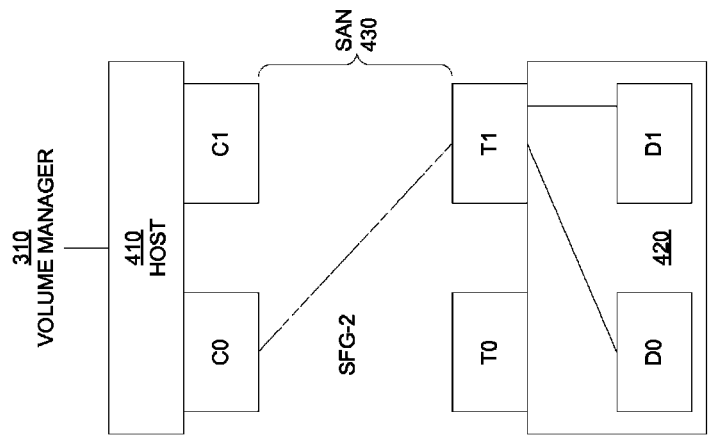
FIGS. 7A, 7B, 7C, and 7D illustrate examples of subpath failover groups that provide potential failover paths in embodiments according to the present disclosure.
Figure 7A:
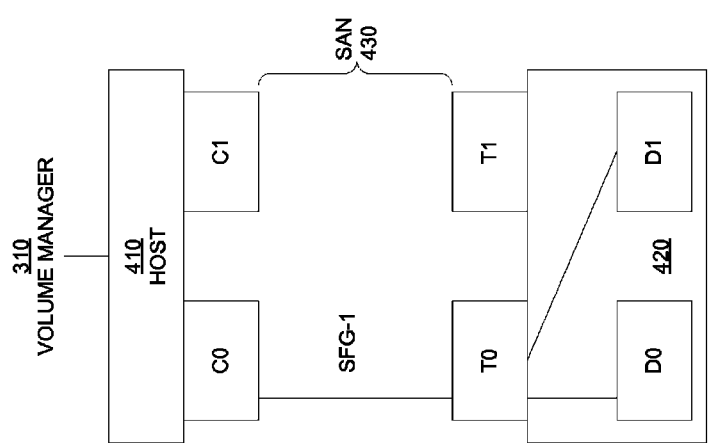

To illustrate the use of SFGs in a failover policy according to embodiments of the present disclosure, consider a relatively simple system that has two initiator endpoints C0 and C1 on the host side, two target endpoints T0 and T1 on the disk array side, and two disks D0 and D1 in the disk array. The first SFG (SFG-1) includes the paths C0-T0-D0 and C0-T0-D1 (FIG. 7A), the second SFG (SFG-2) includes the paths C0-T1-D0 and C0-T1-D1 (FIG. 7B), the third SFG (SFG-3) includes the paths C1-T0-D0 and C1-T0-D1 (FIG. 7C), and the fourth SFG (SFG-4) includes the paths C1-D0 and C1-T1-D1.

Figure 7D:
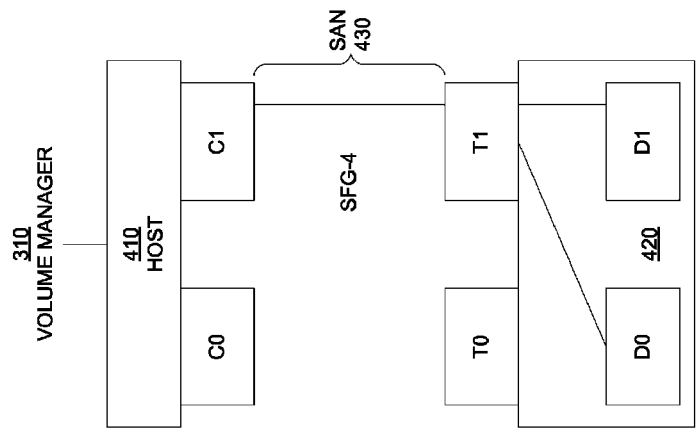
Figure 7C:
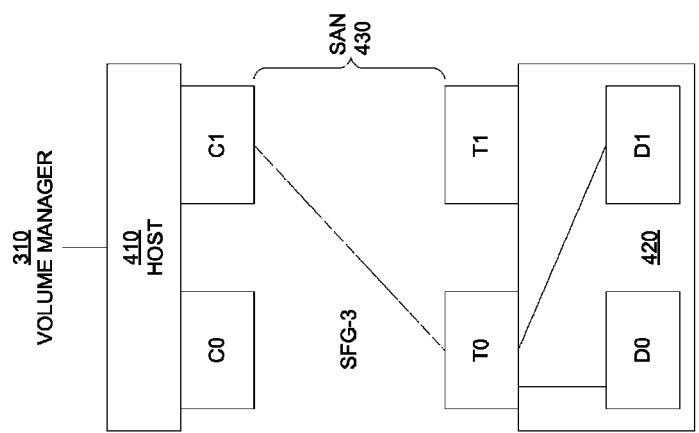

If an I/O request along the path C0-T0-D0 was disrupted, for example, then the failed endpoint could be either C0 or T0. However, according to embodiments of the present disclosure, it is not necessary to determine which endpoint failed in order to pick an alternative path (allowing failover to occur quickly and consequently reducing the frequency at which I/O requests time out). Instead, after observing a failure on a path, the SFGs that include either C0 or T0 as endpoints are eliminated as possible sources for choosing the failover path. More specifically, in this example, all of the paths in SFG-1, SFG-2, and SFG-3 can be marked as suspect. Thus, in this example, SFG-1, SFG-2, and SFG-3 are eliminated as candidates (unless it can be verified that the paths within those SFGs are functional), and the alternative path is chosen from SFG-4 (FIG. 7D). A load balancing policy can be applied to choose a path from among the paths included in SFG-4.

However, if it is not possible to identify an SFG such as SFG-4 in which all paths include only C1 and T1 (that is, if it is not possible to identify an SFG that does not include either C0 or T0), then failover can be made to a path selected from one of the other SFGs. While it is still possible that the new path includes the disabled endpoint, the probability of that occurring is reduced relative to the conventional approach, as presented above.

Figure 8:
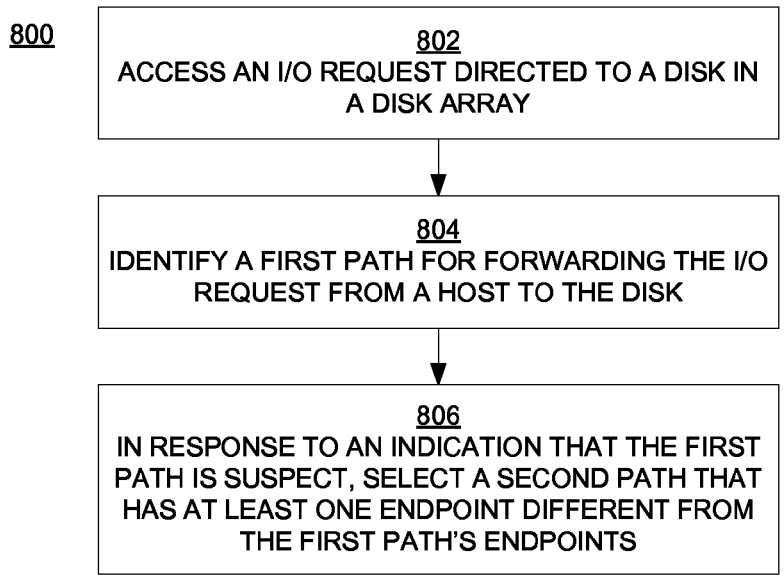
FIG. 8 is a flowchart of a computer-implemented process for selecting a failover path in an embodiment according to the present disclosure.
Figure 9:
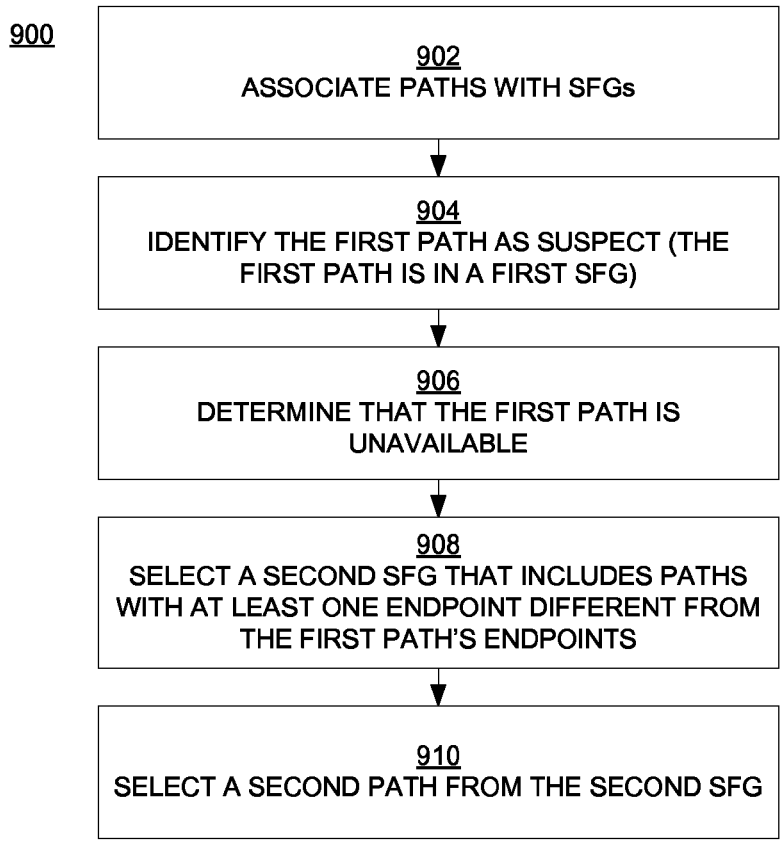
FIG. 9 is a flowchart of a computer-implemented process for selecting a failover path in another embodiment according to the present disclosure.

FIG. 8 is a flowchart 800 of a computer-implemented process for selecting a failover path according to an embodiment of the present disclosure. FIG. 9 is a flowchart 900 of a computer-implemented process for selecting a failover path according to another embodiment of the present disclosure. Flowcharts 800 and 900 can be implemented as computer-executable instructions residing on some form of non-transitory computer-readable storage medium (e.g., using computing system 110 of FIG. 1).

In block 802 of FIG. 8, an I/O request that is directed to a disk in a disk array is accessed.

In block 804, a first path for forwarding the I/O request from a host device to the disk is identified. The first path includes two endpoints separated by a storage area network. The two endpoints include a first initiator endpoint on the host device and a first target endpoint on the disk array.

In block 806, in response to an indication that the first path is suspect or non-functional, a second path to the disk for the I/O request is identified as an alternative to the first path. The second path includes a second initiator endpoint and a second target endpoint. The second path is identified by selecting a path from among a group of paths that have at least one endpoint that is different from the two endpoints of the first path. More specifically, the second initiator endpoint may be different from the first initiator endpoint and the second target endpoint may be different from the first target endpoint, or the second initiator endpoint may be different from the first initiator endpoint, or the second target endpoint may be different from the first target endpoint.

In one embodiment, an attempt is made to identify a path to the disk that has both endpoints different from the two endpoints of the first path. If the attempt is successful, then that path is selected as the second path. If the attempt is unsuccessful, then a path that has only one endpoint that is different from the two endpoints of the first path is selected as the second path.

In block 902 of FIG. 9, in one embodiment, the paths are associated with subpath failover groups (SFGs). The paths in a SFG have the same initiator endpoint and the same target endpoint.

In block 904, a first path for forwarding the I/O request from a host device to the disk is identified as being suspect or non-functional. The first path is in a first SFG. In one embodiment, all paths in the first subpath failover group are marked as suspect.

In block 906, the first path is determined to be unavailable, or is designated as such.

In block 908, to identify a second path that can serve as an alternative to the first path, a second SFG that is different from a first SFG is selected. In one embodiment, an attempt is made to identify a SFG that includes paths to the disk that have both endpoints different from the two endpoints of the first path. If the attempt is successful, then that SFG is selected as the second SFG. If the attempt is unsuccessful, then a SFG that includes paths to the disk that have only one endpoint that is different from the two endpoints of the first path is selected as the second SFG.

In block 910, the second path is selected from the second SFG using, for example, a load balancing policy.

Thus, according to embodiments of the present disclosure, a second (failover) path can be chosen that decreases, and even eliminates, the possibility that the failover path includes the suspect/non-functional endpoint. As noted above, the probability that the failover path will be successful is increased by choosing a path with two (both, all) endpoints that are different from those of the first path if possible, or at least by choosing a path with one endpoint that is different from those of the first path. More specifically, SAN topology information can be used to choose the failover path and service the I/O request, by implementing a policy of choosing an alternative path having an endpoint or endpoints that do not overlap with the path that failed.

Significantly, it is not necessary to identify the endpoint that failed in order to select a failover path. Instead, a failover path can be selected, and mechanisms can be employed in the background to identify and service the disabled endpoint. Because the failover path is not randomly selected but instead is intelligently selected, performance is increased due to the increased likelihood that failover will be successful. Fewer timeouts will occur, and system availability is increased.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

The invention claimed is:

1. A non-transitory computer-readable storage medium having computer-executable instructions for causing a computer system to perform a method comprising:
   accessing an input/output (I/O) request that is directed to a disk in a disk array;
   identifying a first path for forwarding said I/O request from a host device to said disk, wherein said first path comprises two endpoints separated by a storage area network, said two endpoints comprising a first initiator endpoint on said host device and a first target endpoint on said disk array; and
   in response to an indication that said first path is non-functional, identifying a second path to said disk for said I/O request as an alternative to said first path, wherein said second path comprises a second initiator endpoint and a second target endpoint and is identified by selecting a path from among a plurality of paths, wherein said plurality of paths comprises only those paths that have at least one endpoint that is different from said first initiator endpoint and said first target endpoint, wherein said plurality of paths are associated with subpath failover groups, wherein paths in a subpath failover group have common initiator endpoints and common target endpoints.

2. The computer-readable storage medium of claim 1 wherein said second path satisfies a condition selected from the group consisting of: said second initiator endpoint is different from said first initiator endpoint; said second target endpoint is different from said first target endpoint;
   said second initiator endpoint is different from said first initiator endpoint and said second target endpoint is different from said first target endpoint.

3. The computer-readable storage medium of claim 1 wherein said method further comprises:
   selecting a second subpath failover group that is different from a first subpath failover group, wherein said first subpath failover group includes said first path; and
   selecting said second path from said second subpath failover group.

4. The computer-readable storage medium of claim 3 wherein said method further comprises marking all paths in said first subpath failover group as suspect.

5. The computer-readable storage medium of claim 3 wherein said selecting a second subpath failover group comprises:
   attempting to identify a subpath failover group comprising paths to said disk that have both endpoints different from said first initiator endpoint and said first target endpoint, wherein said subpath failover group is selected as said second subpath failover group if said attempting is successful; and
   if said attempting is unsuccessful, then selecting as said second subpath failover group a subpath failover group comprising paths to said disk that have at least one endpoint that is different from said first initiator endpoint and said first target endpoint.

6. The computer-readable storage medium of claim 1 wherein said first path is non-functional due to failure of at least one of said first initiator endpoint and said first target endpoint and not due to a failure in said storage area network.

7. The computer-readable storage medium of claim 1 wherein said method further comprises selecting said second path from said plurality of paths according to a load balancing policy.

8. A computer system comprising:
a processor; and
memory coupled to said processor and having stored therein instructions that, if executed by said computer system, cause said computer system to execute a method comprising:
accessing an input/output (I/O) request generated by an application;
selecting a first path for forwarding said I/O request to a disk on a disk array coupled to said computer system by a storage area network, wherein said first path comprises two endpoints comprising a first initiator endpoint on said computer system and a first target endpoint on said disk array;
determining that said first path is unavailable;
before expiration of a timeout period associated with said I/O request, identifying a plurality of paths comprising only those paths to said disk that have at least one endpoint that is different from said first initiator endpoint and said first target endpoint, wherein said plurality of paths are associated with subpath failover groups, wherein paths in a subpath failover group have common initiator endpoints and common target endpoints; and
selecting a second path from among said plurality of paths, said second path serving as an alternative to said first path for said I/O request.

9. The computer system of claim 8 wherein said second path satisfies a condition selected from the group consisting of: said second initiator endpoint is different from said first initiator endpoint; said second target endpoint is different from said first target endpoint; said second initiator endpoint is different from said first initiator endpoint and said second target endpoint is different from said first target endpoint.

10. The computer system of claim 8 wherein said method further comprises:
selecting a second subpath failover group that is different from a first subpath failover group, wherein said first subpath failover group includes said first path; and
selecting said second path from said second subpath failover group.

11. The computer system of claim 10 wherein said method further comprises:
marking all paths in said first subpath failover group as suspect;
attempting to identify a subpath failover group comprising paths to said disk that have both endpoints different from said first initiator endpoint and said first target endpoint, wherein said subpath failover group is selected as said second subpath failover group if said attempting is successful; and
if said attempting is unsuccessful, then selecting as said second subpath failover group a subpath failover group comprising paths to said disk that have at least one endpoint that is different from said first initiator endpoint and said first target endpoint.

12. The computer system of claim 8 wherein said first path is non-functional due to transport failure of at least one of said first initiator endpoint and said first target endpoint and not due to a failure in said storage area network.

13. The computer system of claim 8 wherein said method further comprises selecting said second path from said plurality of paths according to a load balancing policy.

14. A system comprising:
a host device comprising a first initiator endpoint and a second initiator endpoint;
a disk array comprising a first target endpoint and a second target endpoint; and
a storage area network coupling said host device and said disk array, wherein said host device is operable for identifying a first path for forwarding an I/O request to said disk, wherein said first path comprises two endpoints comprising said first initiator endpoint and said first target endpoint, said host device further operable for determining whether said first path is non-functional and identifying a second path to said disk for said I/O request as an alternative to said first path, wherein said second path is selected from among a plurality of paths to said disk that have at least one endpoint that is different from said path first initiator endpoint and said first target endpoint, wherein said plurality of paths are associated with subpath failover groups, wherein paths in a subpath failover group have common initiator endpoints and common target endpoints.

15. The system of claim 14 wherein said second path comprises a path to said disk having two endpoints that are different from said first initiator endpoint and said first target endpoint.

16. The system of claim 14 wherein said second path is selected from a second subpath failover group that is different from a first subpath failover group that includes said first path.

17. The system of claim 16 wherein all paths in said first subpath failover group are marked as suspect if said first path is determined to be non-functional.

18. The system of claim 16 wherein said second subpath failover group is selected by first making an attempt to identify a subpath failover group comprising paths to said disk that have both endpoints different from said first initiator endpoint and said first target endpoint, wherein said subpath failover group is selected as said second subpath failover group if said attempt is successful, wherein otherwise a subpath failover group comprising paths to said disk that have at least one endpoint that is different from said first initiator endpoint and said first target endpoint is selected as said second subpath failover group.

19. The system of claim 14 wherein said first path is non-functional due to failure of at least one of said first initiator endpoint and said first target endpoint and not due to a failure in said storage area network.

20. The system of claim 14 wherein said method wherein said second path is selected from said plurality of paths according to a load balancing policy.

* * * * *